(12) United States Patent
Egami et al.

(10) Patent No.: US 7,609,023 B2
(45) Date of Patent: Oct. 27, 2009

(54) CONTROL APPARATUS FOR ELECTRIC VEHICLES

(75) Inventors: Tsuneyuki Egami, Gamagori (JP); Keiichi Kawakami, Anjo (JP)

(73) Assignee: DENSO Corporation, Kariya (JP)

( * ) Notice: Subject to any disclaimer, the term of this patent is extended or adjusted under 35 U.S.C. 154(b) by 336 days.

(21) Appl. No.: 11/606,060

(22) Filed: Nov. 30, 2006

(65) Prior Publication Data

US 2007/0125582 A1 Jun. 7, 2007

(30) Foreign Application Priority Data

Dec. 7, 2005 (JP) ............................. 2005-353076

(51) Int. Cl.
*H02P 27/04* (2006.01)
(52) U.S. Cl. ................. 318/801; 318/140; 318/504; 318/615; 318/616; 363/15; 363/17
(58) Field of Classification Search ................ 318/901, 318/139, 140, 504, 615, 616, 801; 363/15, 363/16, 17
See application file for complete search history.

(56) References Cited

U.S. PATENT DOCUMENTS

| | | | |
|---|---|---|---|
| 7,099,756 B2 | 8/2006 | Sato | |
| 7,120,037 B2* | 10/2006 | Komatsu et al. | ............... 363/37 |
| 7,212,891 B2 | 5/2007 | Sato | |
| 7,235,937 B2* | 6/2007 | Takai et al. | ................. 318/139 |
| 2002/0110007 A1 | 8/2002 | Kalman et al. | |
| 2004/0145338 A1 | 7/2004 | Nakamura et al. | |
| 2004/0145356 A1 | 7/2004 | Kalman et al. | |
| 2004/0189226 A1 | 9/2004 | King | |
| 2006/0052915 A1* | 3/2006 | Sato | .............................. 701/22 |
| 2006/0152085 A1* | 7/2006 | Flett et al. | ...................... 307/75 |
| 2006/0247829 A1 | 11/2006 | Sato | |
| 2007/0119634 A1 | 5/2007 | Egami et al. | |
| 2007/0125582 A1 | 6/2007 | Egami et al. | |
| 2007/0126385 A1 | 6/2007 | Egami et al. | |
| 2007/0145926 A1 | 6/2007 | Egami et al. | |
| 2007/0145927 A1 | 6/2007 | Egami et al. | |
| 2007/0194763 A1 | 8/2007 | Egami et al. | |

FOREIGN PATENT DOCUMENTS

| | | |
|---|---|---|
| EP | 1000796 A2 | 5/2000 |
| EP | 1 460 756 A1 | 9/2004 |
| EP | 1603224 A | 12/2005 |
| EP | 1 800 934 A2 | 6/2007 |
| EP | 1 800 936 A2 | 6/2007 |
| JP | 2003-259689 | 9/2003 |

OTHER PUBLICATIONS

Extended EP Search Report dated Mar. 12, 2007.

(Continued)

*Primary Examiner*—Rita Leykin
(74) *Attorney, Agent, or Firm*—Nixon & Vanderhye P.C.

(57) ABSTRACT

In electric vehicle control, system voltage stabilization control is executed to reduce the difference between a target value and detected value of a system voltage generated by a voltage boosting converter for an AC motor. Further, conversion power control is executed to reduce the difference between a command value and detected value of the conversion power, which is defined as the output power of the voltage boosting converter. A conversion power correction quantity is computed from an input power operation quantity of the system voltage stabilization control and reflected in the conversion power control to correct the conversion power. Thus, variations in a system voltage caused by an error or the conversion power control can be reduced.

12 Claims, 7 Drawing Sheets

OTHER PUBLICATIONS

Extended EP Search Report dated Feb. 28, 2007.
Examination Report dated Aug. 4, 2008 in EP 06 125 077.5.
U.S. Appl. No. 11/605,456, filed Nov. 29, 2006.
U.S. Appl. No. 11/606,061, filed Nov. 30, 2006.
U.S. Appl. No. 11/640,407, filed Dec. 18, 2006.
U.S. Appl. No. 11/643,980, filed Dec. 22, 2006.
U.S. Appl. No. 11/653,848, filed Jan. 17, 2007.
U.S. Appl. No. 11/707,903, filed Feb. 20, 2007.
EPO Search/Examination Report dated Jul. 18, 2007 in European Application No. 07103332.8.
U.S. Appl. No. 11/950,768, filed Dec. 5, 2007.
U.S. Appl. No. 12/068,595, filed Feb. 8, 2008.

* cited by examiner

CONTROL APPARATUS FOR ELECTRIC VEHICLES

CROSS REFERENCE TO RELATED APPLICATION

This application is based on and incorporates herein by reference Japanese Patent Application No. 2005-353076 filed on Dec. 7, 2005.

This application is related to five U.S. patent applications claiming priorities to the following Japanese Patent Applications, respectively:
No. 2005-343750 filed on Nov. 29, 2005;
No. 2005-353075 filed on Dec. 7, 2005;
No. 2005-372966 filed on Dec. 26, 2005;
No. 2005-371264 filed on Dec. 26, 2005; and
No. 2006-40272 filed on Feb. 17, 2006.

FIELD OF THE INVENTION

The present invention relates to a control apparatus for an electric vehicle including a system mounted therein as a system for converting a voltage generated by a DC power supply into a system voltage by using a voltage converter and for driving an AC motor by applying the system voltage to the AC motor through an inverter.

BACKGROUND OF THE INVENTION

As disclosed in documents such as U.S. 2006/0052915A1 (JP 2004-274945A), in an electric vehicle having AC motors mounted therein to serve as a power source of the vehicle, the AC motors are each capable of serving as a motor for driving wheels of the vehicle as well as a motor driven by the engine to generate power. As the above system, a control apparatus for the electric vehicle includes a voltage boosting converter for raising a voltage generated by a DC power supply, which is implemented by a secondary battery, to a high DC voltage appearing on a power supply line connected to AC motors through inverters. The inverters are capable of serving as a component for converting the raised DC voltage appearing on the power supply line into an AC voltage for driving one of the AC motors as well as a component for converting the AC voltage into a DC voltage supplied back or restored to the secondary battery through the voltage boosting converter, which lowers the level of the DC voltage.

In the above system, in order to stabilize the voltage appearing on the power supply line, the voltage boosting converter controls the voltage appearing on the power supply line to a target voltage. Further, at the same time, a smoothing capacitor connected to the power supply line smoothes the voltage appearing on the power supply line.

When a relation between electric power driving one of the AC motors and electric power generated by the other AC motor considerably varies due to a change in vehicle operating state or another reason, however, voltage variations caused by a change in such relation as voltage variations of the power supply line cannot be absorbed by the voltage boosting converter and/or the smoothing capacitor. Thus, the voltage appearing on the power supply line becomes excessively high. As a result, it is likely that electronic equipment connected to the power supply line is damaged. In order to cope with this problem, there is provided a method for enhancing the effect of stabilizing the voltage appearing on the power supply line by using an improved voltage boosting converter with better performance and a smoothing capacitor with a larger capacitance. By adoption of this method, however, the voltage boosting converter with better performance and the smoothing capacitor with a larger capacitance will inevitably raise the cost of the control apparatus for an electric vehicle. Thus, demands for a system having a small size and a low cost cannot be met. The above relation between the power driving one of the AC motors and the power generated by the other AC motor is also referred to as a balance of power between the power driving one of the AC motors and the power generated by the other AC motor.

It is proposed for controlling the inverter to make a sum of energies (or the balance of electric power) of the two AC motors equal to 0 at the time the connection between the DC power supply and the voltage boosting converter is cut off by using a relay in the event of a failure occurring in the DC power supply. However, this method is provided as a countermeasure to a failure occurring in the DC power supply and is capable of enhancing the effect of stabilizing the voltage appearing on the power supply line in a normal state of the power supply. In addition, even if an attempt is made to control the inverter to make a sum of energies (or the balance of power) of the two AC motors equal to 0 in a normal state, it is extremely difficult to control the inverter to make the sum of energies (or the balance of power) of the two AC motors equal to 0 in the following cases.

In the first place, one of the AC motors is linked to a driving shaft of the electric vehicle and the other AC motor is linked to an output shaft of the internal combustion engine, that is, the two AC motors are linked to members having different operations. In the second place, the effect of a processing delay of the control executed on the inverter becomes larger, for example, during a transient in which the operating state of the electric vehicle changes. The AC motor linked to the internal combustion engine is not capable of obviating power variations caused by changes of a torque generated by the internal combustion engine. This fact makes it even more difficult to control the inverter to make the sum of energies of the two AC motors equal to 0.

SUMMARY OF THE INVENTION

It is thus an object of the present invention to improve a control apparatus for electric vehicles to be capable of stabilizing a voltage appearing on a power supply line in small size and low cost.

A control apparatus for an electric vehicle, in one aspect of the present invention, comprises a power conversion unit, a motor driving unit (MG unit), a system voltage stabilization control unit and a conversion power control unit. The power conversion unit converts a voltage generated by a DC power supply into a system voltage appearing on a power supply line. The MG unit includes an inverter connected to the power supply line and an AC motor driven by the inverter. The system voltage stabilization control unit executes system voltage stabilization control to stabilize the system voltage by adjusting an input power of the MG unit in order to suppress variations in system voltage. A conversion power control unit executes conversion power control based on control information on the system voltage stabilization control to adjust a conversion power, which is defined as an input or output power of the power conversion unit.

In the above-configured control apparatus, the system voltage stabilization control unit is capable of suppressing variations in system voltage through execution of the system voltage stabilization control to stabilize the system voltage by adjusting an input power of the MG unit. Thus, even if the balance of power between power driving one of the AC motors and power generated by the other AC motor considerably changes due to a change in vehicle operating state or another reason, the system voltage defined as the voltage appearing on the power supply line can be stabilized effectively. In addition, it is possible to enhance the effect of stabilizing the system voltage appearing on the power supply line while meeting demands for a system having a small size and a low cost without employing a voltage boosting converter with better performance and a smoothing capacitor with a larger capacitance.

It is likely that, if the system voltage stabilization control is executed to stabilize the system voltage by adjusting an input power of the MG unit in order to suppress variations in system voltage, there will be mutual interferences between the system voltage stabilization control to stabilize the system voltage by adjusting the input power of the MG unit in order to suppress variations in system voltage and control executed by the power conversion unit to adjust the system voltage. In spite of such possibility, the conversion power control unit is capable of executing the conversion power control to adjust the conversion power, which is defined as an input or output power of the power conversion unit, to obviate the mutual interferences between the system voltage stabilization control to stabilize the system voltage by adjusting the input power of the MG unit in order to suppress variations in system voltage and control executed by the power conversion unit to adjust the system voltage.

In the above apparatus, due to some causes such as manufacturing dispersions of machine constants of the AC motors and AC-motor aging with the lapse of time, if the precision of the conversion power control decreases, increasing system voltage variations, which are defined as offsets between the actual system voltage and a target value, the system voltage variations caused by a control error of the conversion power control can be corrected by execution of the system voltage stabilization control to stabilize the system voltage by adjusting the input power of the MG unit. However, the operation to correct the system voltage variations caused by the control error increases a load borne by the system voltage stabilization control to stabilize the system voltage. Thus, the dynamic range of the system voltage stabilization control to stabilize the system voltage unavoidably becomes narrower. As a result, it is likely that the function to stabilize the system voltage cannot be implemented sufficiently.

It is therefore preferred that the control apparatus also comprises a correction quantity computation unit and a conversion power correction unit. The correction quantity computation unit computes the correction quantity on the basis of control information, which is defined as information on the system voltage stabilization control to stabilize the system voltage. The conversion power correction unit corrects the correction power by reflecting the correction quantity in the conversion power control. That is, if the precision of the conversion power control deteriorates, increasing variations in system voltage, variations in conversion power also increase accordingly, raising variations in system voltage as well. Thus, in this case, the control information defined as information on the system voltage stabilization control to stabilize the system voltage in order to suppress variations in system voltage also changes. An example of the control information is the quantity of the input power. As a result, by using the control information defined as information on the system voltage stabilization control to stabilize the system voltage, a correction quantity used for correcting the conversion power as a quantity reflecting a control error of the conversion power control with a high degree of precision can be computed. By reflecting the correction quantity used for correcting the conversion power in the control of the conversion power, the control error of the conversion power control can be reduced, the conversion power can be corrected with a high degree of precision and conversion power variations (that is, variations in system voltage) caused by the control error of the conversion power control can also be decreased as well. Therefore, since the conversion power variations (that is, the variations in system voltage) caused by the control error of the conversion power control can be corrected in the control of the conversion power, the load borne by the system voltage stabilization control to stabilize the system voltage can be reduced. Thus it is made possible to prevent the dynamic range of the system voltage stabilization control to stabilize the system voltage from becoming narrower and possible to implement the function to stabilize the system voltage sufficiently.

In this case, it is preferred to let the correction quantity computation unit compute the correction quantity on the basis of control information defined as information on the system voltage stabilization control to stabilize the system voltage in a steady state of the MG unit. This is because, in a steady state of the MG unit, the balance of power between the AC motors hardly changes so that conversion power variations (that is, variations in system voltage) caused by a change in power balance between the AC motors hardly occur and only the conversion power variations (that is, the variations in system voltage) caused by the control error of the conversion power control are observed. Thus, by letting the correction quantity computation unit compute the correction quantity on the basis of control information defined as information on the system voltage stabilization control to stabilize the system voltage in a steady state of the MG unit, it is possible to compute a correction quantity used for correcting the conversion power as a quantity reflecting a control error of the conversion power control with a high degree of precision almost without being affected by the conversion power variations (that is, the variations in system voltage) caused by a change in power balance between the AC motors.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
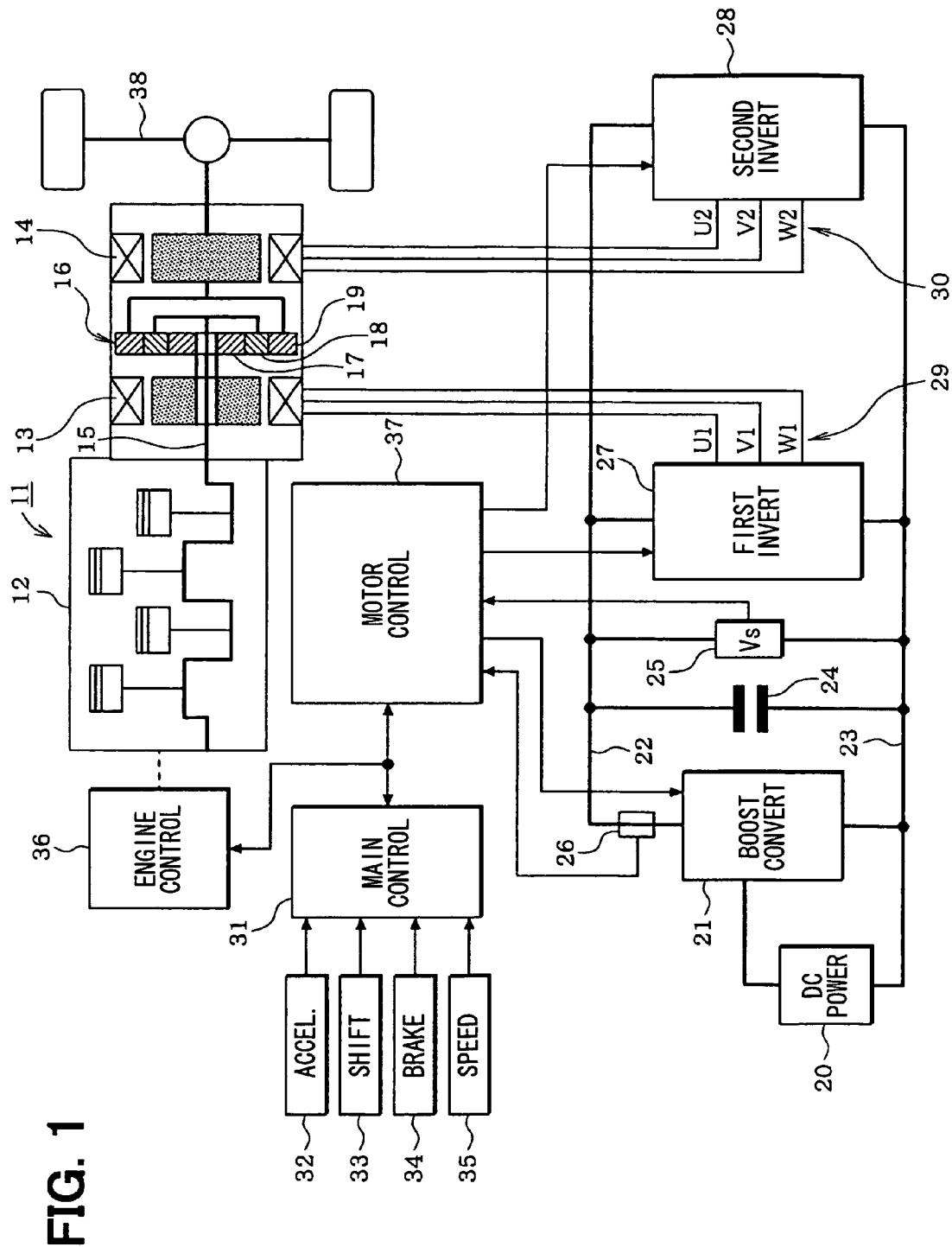
FIG. 1 is a block diagram showing a driving system for an electric vehicle in accordance with a first embodiment of the present invention.

Referring first to FIG. 1, an electric vehicle 11 has an internal combustion engine 12 in addition to a first AC motor 13 and a second AC motor 14. Thus, the electric vehicle 11 is an engine/motor hybrid vehicle. The engine 12 and the second AC motor 14 are employed as a drive power source for driving the electric vehicle 11. Power generated by a crankshaft 15 of the engine 12 is divided into two paths by a planetary gear set 16. The planetary gear set 16 includes a sun gear 17, a planetary gear 18 and a ring gear 19. The sun gear 17 rotates at the center. The planetary gear 18 rotates along a circumference external to the sun gear 17 while revolving around the center of its own. The ring gear 19 rotates along a circumference external to the planetary gear 18. The planetary gear 18 is linked to the crankshaft 15 of the engine 12 through a carrier not shown in the figure. On the other hand, the ring gear 19 is linked to a rotation shaft of the second AC motor 14. The sun gear 17 is linked to the first AC motor 13.

A secondary battery serving as a DC power supply 20 is connected to a voltage boosting converter 21 serving as a power conversion means. The voltage boosting converter 21 is a component having a function for increasing a DC voltage output by the DC power supply 20 in order to generate a DC system voltage supplied between a power supply line 22 and a ground line 23 as well as a function for decreasing the system voltage in order to return or restore power to the DC power supply 20. A smoothing capacitor 24 for smoothing the system voltage and a voltage sensor 25 serving as a voltage detection means for detecting a value of the system voltage are connected between the power supply line 22 and the ground line 23. A current sensor 26 serving as a current detection means is placed on the power supply line 22 as a means for detecting a current flowing through the power supply line 22.

In addition, a three-phase first inverter 27 and a three-phase second inverter 28 are also connected between the power supply line 22 and the ground line 23. The three-phase first inverter 27 and the three-phase second inverter 28 are each a three-phase inverter of a voltage control type. The three-phase first inverter 27 drives the first AC motor 13, whereas the three-phase second inverter 28 drives the second AC motor 14. The three-phase first inverter 27 and the first AC motor 13 form a first motor driving unit 29, which is also referred to as a first MG unit 29. Similarly, the three-phase second inverter 28 and the second AC motor 14 form a second motor driving unit 30, which is also referred to as a second MG unit 30.

A main control unit 31 is a computer for executing overall control on the electric vehicle as a whole. The main control unit 31 acquires signals output by a variety of sensors and switches in order to detect an operating state of the electric vehicle. The sensors and the switches include an accelerator sensor 32, a shift switch 33, a brake switch 34 and a vehicle speed sensor 35. The accelerator sensor 32 is a sensor for detecting an acceleration operation quantity representing an operation quantity of an acceleration pedal. The shift switch 33 is a sensor for detecting the position of a shift operation of the electric vehicle. The position of the shift operation can be a parking position (P), a rear driving position (R), a neutral position (N) or a forward driving position (D). The brake switch 34 is a switch for detecting a braking operation. The vehicle speed sensor 35 is a sensor for detecting a value of the speed of the electric vehicle. The main control unit 31 exchanges control and data signals with an engine control unit 36 and a motor control unit 37, driving the engine control unit 36 and the motor control unit 37 in order to control the engine 12, the first AC motor 13 and the second AC motor 14 in accordance with the operating state of the electric vehicle. The engine control unit 36 is for controlling the operation of the engine 12, whereas the motor control unit 37 is for controlling the operations of the first AC motor 13 and the second AC motor 14.

Figure 2:
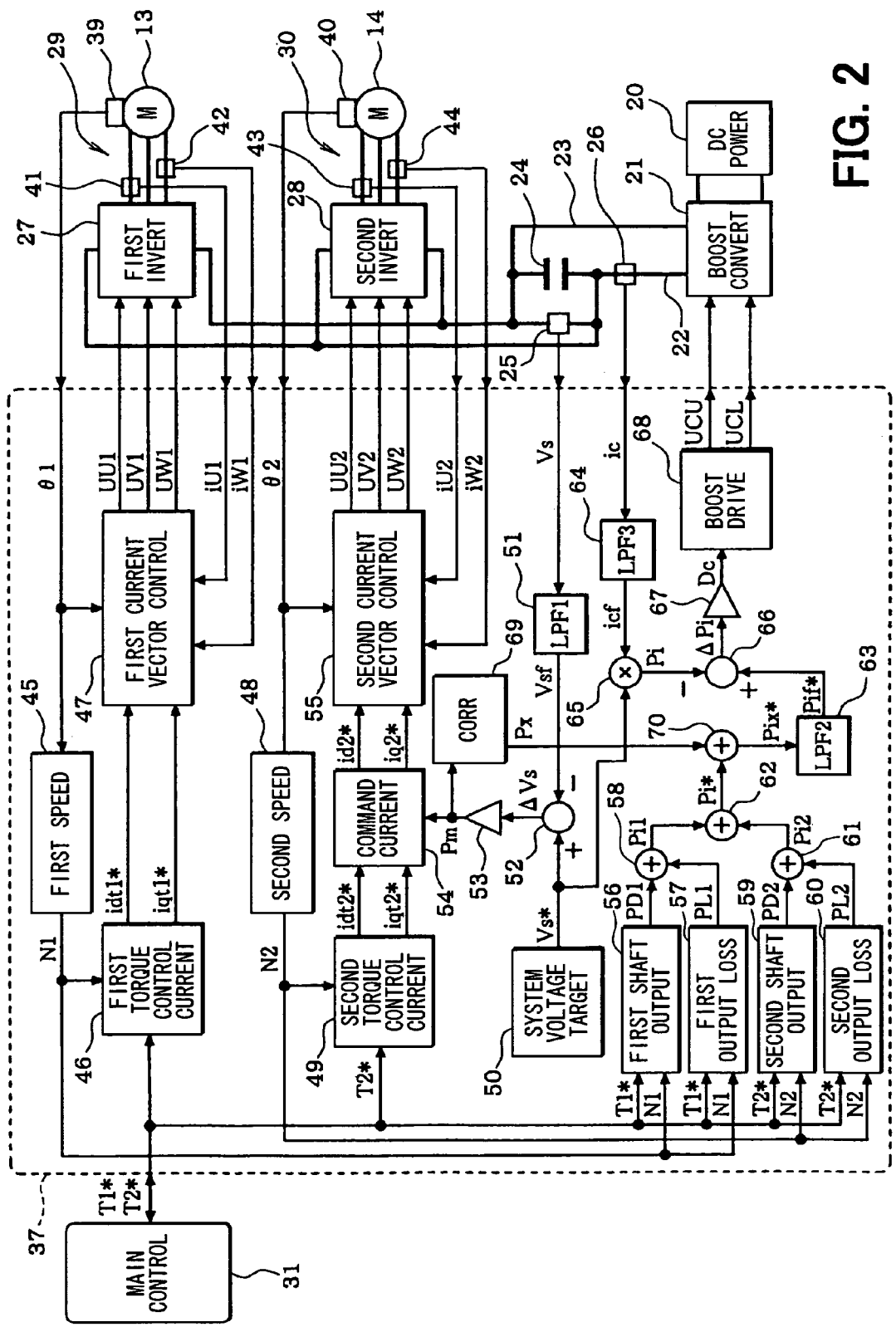
FIG. 2 is a block diagram showing a control system employed in the driving system as a control system for controlling AC motors of the driving system in accordance with the first embodiment.

Next, control of the first AC motor 13 and the second AC motor 14 is described by referring to FIG. 2. The first AC motor 13 and the second AC motor 14 are each a three-phase permanent-magnet synchronous motor having an interior permanent magnet. The first AC motor 13 and the second AC motor 14 have respectively rotor rotational position sensors 39 and 40 each used for detecting the rotational position of the rotor of the motor. On the basis of three-phase voltage command signals UU1, UV1 and UW1 output by the motor control unit 37, the first inverter 27 of the voltage control type converts a DC voltage appearing on the power supply line 22 into three-phase AC voltages U1, V1 and W1 for driving the first AC motor 13. The DC voltage appearing on the power supply line 22 is a system voltage generated by the voltage boosting converter 21. A U-phase current sensor 41 is a sensor for detecting a U-phase current iU1 of the first AC motor 13, whereas a W-phase current sensor 42 is a sensor for detecting a W-phase current iW1 of the first AC motor 13.

Similarly, on the basis of three-phase voltage command signals UU2, UV2 and UW2 output by the motor control unit 37, the three-phase second inverter 28 of the voltage control type converts the DC voltage appearing on the power supply line 22 into three-phase AC voltages U2, V2 and W2 for driving the second AC motor 14. A U-phase current sensor 43 is a sensor for detecting a U-phase current iU2 of the second AC motor 14, whereas a W-phase current sensor 44 is a sensor for detecting a W-phase current iW2 of the first AC motor 13.

It is to be noted that the first AC motor 13 and the second AC motor 14 each also function as a generator, when the first AC motor 13 and the second AC motor 14 are driven by the three-phase first inverter 27 and the three-phase second inverter 28 respectively to generate a negative torque. For example, when the electric vehicle 11 is being decelerated, AC power generated by the second AC motor 14 as a deceleration energy is converted into DC power by the three-phase second inverter 28 and the DC power is accumulated back in the DC power supply 20. Normally, a portion of power of the engine 12 is transferred to the first AC motor 13 by way of the planetary gear 18, causing the first AC motor 13 to operate as a generator for generating electric power corresponding to the portion of the power of the engine 12. The electric power generated by the first AC motor 13 is supplied to the second AC motor 14, causing the second AC motor 14 to operate as a motor. The power of the engine 12 is divided into two paths by the planetary gear set 16. When a torque propagated to the ring gear 19 of the planetary gear set 16 is greater than a torque required by a running operation of the electric vehicle, the first AC motor 13 functions as a motor, drawing power for the engine 12. In this case, the second AC motor 14 functions as a generator generating power to be supplied to the first AC motor 13. Thus, each of the first AC motor 13 and the second AC motor 14 operates as a motor/generator (MG).

In execution of torque control on the first AC motor 13, the motor control unit 37 generates the three-phase voltage command signals UU1, UV1 and UW1 by a sinusoidal-waveform PWM control method on the basis of a torque command value T1* output by the main control unit 31, the U-phase current iU1 and W-phase current iW1 of the first AC motor 13 as well as the rotor rotational position θ1 of the first AC motor 13 as described below. As described above, the U-phase current iU1 and the W-phase current iW1 are signals output by the current sensors 41 and 42 respectively, whereas the rotor rotational position θ1 is a signal output by a rotor rotational position sensor 39.

The signal output by the rotor rotational position sensor 39 as a signal representing the rotor rotational position θ1 of the first AC motor 13 is supplied to a rotation speed computation unit 45 for computing a first rotation speed N1 of the first AC motor 13. Then, in order to apply current feedback control to each of a d-axis current id1 and a q-axis current iq1 independently of each other in a d-q coordinate system set as a rotational coordinate system of the rotor of the first AC motor 13, a first torque control current computation unit 46 computes a torque control current vector it1* representing a d-axis torque control current idt1* and a q-axis torque control current iqt1* by using typically map data or an equation as a vector according to the torque command value T1* and rotation speed N1 of the first AC motor 13.

Subsequently, a first current vector control unit 47 computes an actual current vector i1 representing the d-axis current id1 and the q-axis current iq1 on the basis of the U-phase current iU1 and W-phase current iW1 of the first AC motor 13 as well as the rotor rotational position θ1 of the first AC motor 13 as described below. As described above, the U-phase current iU1 and the W-phase current iW1 are signals output by the current sensors 41 and 42 respectively, whereas the rotor rotational position θ1 is a signal output by the rotor rotational position sensor 39. Then, the first current vector control unit 47 computes a d-axis command voltage Vd1* by execution of P-I control for reducing a difference Δid1 between a d-axis torque control current idt1* and an actual d-axis current id1, and computes a q-axis command voltage Vq1* by execution of proportional-and-integral (P-I) control for reducing a difference Δiq1 between a q-axis torque control current iqt1* and an actual q-axis current iq1. Finally, the first current vector control unit 47 converts the d-axis command voltage Vd1* and the q-axis command voltage Vq1* into the three-phase PWM command signals UU1, UV1 and UW1, outputting the three-phase PWM command signals UU1, UV1 and UW1 to the three-phase first inverter 27.

In execution of torque control on the second AC motor 14, on the other hand, the motor control unit 37 generates the three-phase voltage command signals UU2, UV2 and UW2 by the sinusoidal-waveform PWM control method on the basis of a torque command value T2* output by the main control unit 31, the U-phase current iU2 and W-phase current iW2 of the second AC motor 14 as well as the rotor rotational position θ2 of the second AC motor 14. As described below, the U-phase current iU1 and the W-phase current iW1 are signals output by the current sensors 43 and 44 respectively, whereas the rotor rotational position θ1 is a signal output by the rotor rotational position sensor 40.

At that time, control of stabilizing the system voltage is executed in order to suppress variations in system voltage while sustaining the torque generated by the second AC motor 14 at a constant value (that is, a torque command value T2*) by adjusting an input power of the second AC motor 14 through adjustment of a current vector so as to change only the input power (or reactive power) different from the power required for generation of the torque of the second AC motor 14.

Specifically, first of all, the signal output by a rotor rotational position sensor 40 as a signal representing the rotor rotational position θ2 of the second AC motor 14 is supplied to a rotation speed computation unit 48 for computing a rotation speed N2 of the second AC motor 14. Then, in order to apply current feedback control to each of a d-axis current id2 and a q-axis current iq2 independently of each other in a d-q coordinate system set as a rotational coordinate system of the rotor of the second AC motor 14, a second torque control current computation unit 49 computes a torque control current vector it2* representing a d-axis torque control current idt2* and a q-axis torque control current iqt2* by using typically map data or an equation as a vector according to the torque command value T2* and rotation speed N2 of the second AC motor 14.

Then, a system voltage target value computation unit 50 serving as a target value computation means computes a target value Vs* of the system voltage, whereas the voltage sensor 25 supplies a detected value Vs of the system voltage to a low pass filter 51 serving as a first low-frequency component passing means for carrying out a low pass filtering process to pass only components included in the detected value Vs of the system voltage as components each having a low frequency. Subsequently, a subtractor 52 computes a difference ΔVs between the target value Vs* of the system voltage and a detected value Vsf output by the low pass filtering process as the detected value of the system voltage, supplying the difference ΔVs to the a P-I controller 53 serving as a power operation quantity computation means for computing an input power operation quantity Pm of the second AC motor 14 as a quantity that reduces the difference ΔVs between the target value Vs* of the system voltage and the detected value Vsf output by the low pass filtering process as the detected value of the system voltage by execution of P-I control.

Figure 3:
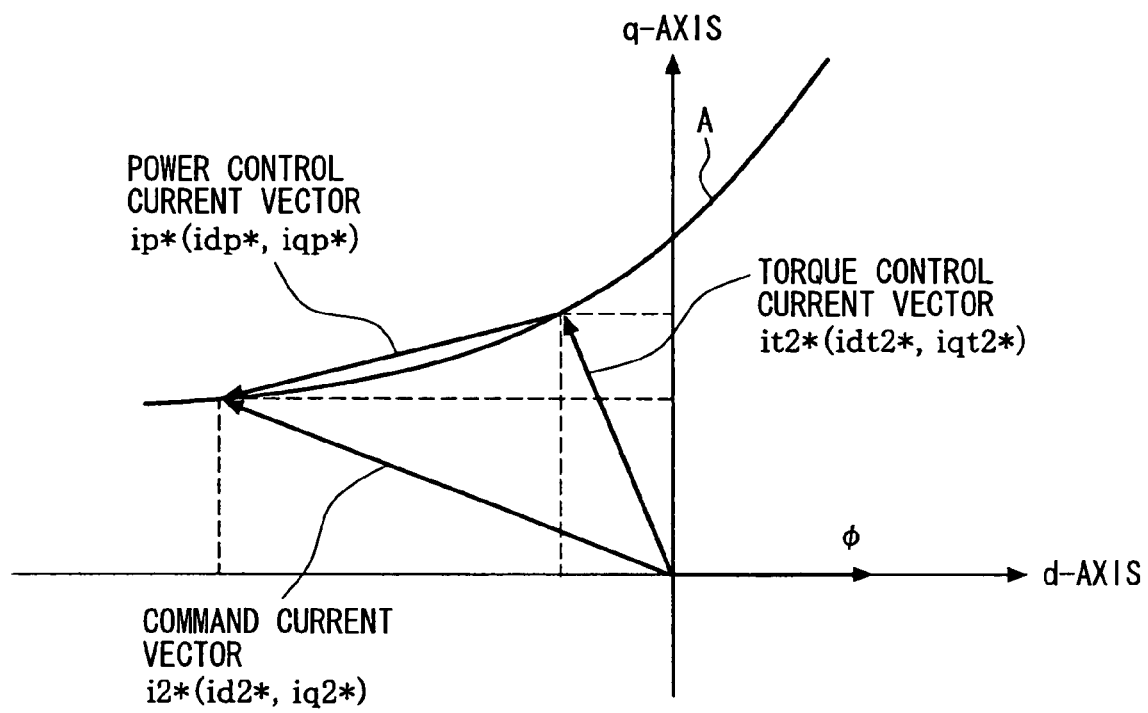
FIG. 3 is a graph showing a characteristic of a current vector used for computing a command current vector in the first embodiment.

Then, the input power operation quantity Pm and the torque control current vector it2* representing a d-axis torque control current idt2* and a q-axis torque control current iqt2* are supplied to a command current computation unit 54 serving as a system voltage stabilization control means, which then computes a power control current vector ip* representing a d-axis power control current idp* and a q-axis power control current iqp*. The d-axis power control current idp* and the q-axis power control current iqp* change the reactive power contributing none to generation of the torque of the second AC motor 14 by the input power operation quantity Pm as shown in FIG. 3. Then, the command current computation unit 54 synthesizes the torque control current vector it2* representing a d-axis torque control current idt2* and a q-axis torque control current iqt2* with the power control current vector ip* representing a d-axis power control current idp* and a q-axis power control current iqp* in order to compute a final command current vector i2* representing a d-axis command current id2* and a q-axis command current iq2* as expressed by the following equation:

$$i2*(id2*, iq2*)=it2*(idt2*, iqt2*)+ip*(idp*, iqp*)$$

Figure 4:
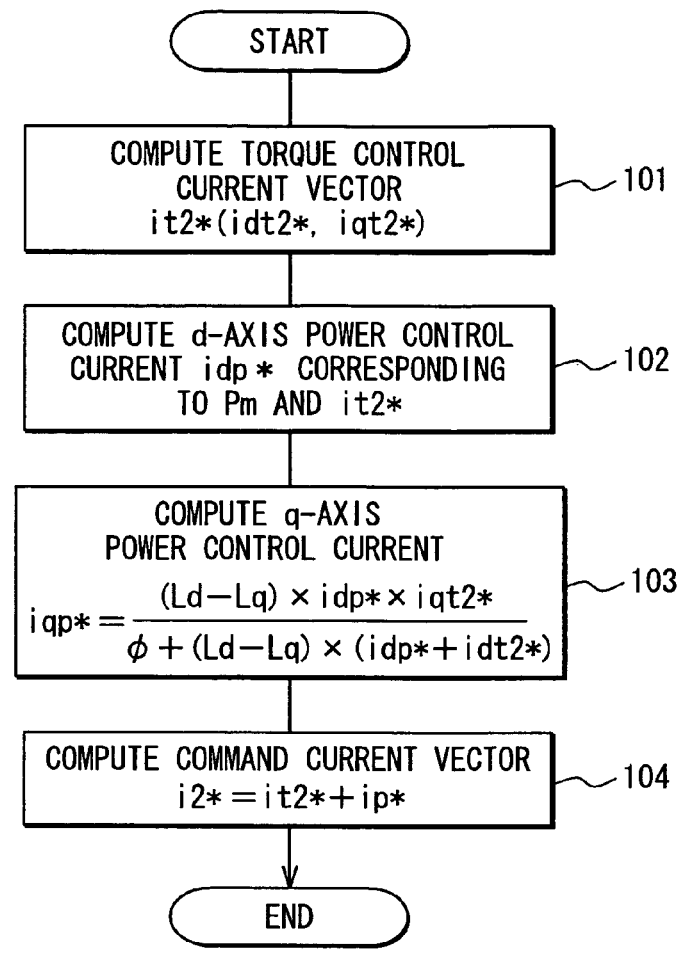
FIG. 4 is a flowchart representing processing of a subprogram to be executed to compute a command current vector in the first embodiment.

The final command current vector i2* is computed by execution of a command current vector computation program shown in FIG. 4. The flowchart of FIG. 4 representing the command current vector computation sub-program begins at step 101 at which the torque control current vector it2* representing the d-axis torque control current idt2* and the q-axis torque control current iqt2* is computed by using typically map data or an equation as a vector according to the torque command value T2* and rotation speed N2 of the second AC motor 14.

Then, at the next step 102, the d-axis power control current idp* corresponding to the input power operation quantity Pm and the torque control current vector it2* representing the d-axis torque control current idt2* and the q-axis torque control current iqt2* is computed by using typically map data or an equation. Subsequently, at the next step 103, a q-axis power control current iqp* is computed from the d-axis power control current idp* in accordance with the following equation:

$$iqp^* = (Ld-Lq) \times idp^* \times iqt2^* / \{\phi + (Ld-Lq) \times (idp^* + idt2^*)\}$$

where notations $\phi$, Ld and Lq denote respectively a flux linkage, a d-axis inductance and a q-axis inductance, which are machine constants of the second AC motor 14.

Thus, the processes of the steps 102 and 103 are carried out to compute a power control current vector ip* representing the d-axis power control current idp* and the q-axis power control current iqp*, which change the reactive power by the input power operation quantity Pm while sustaining the torque generated by the second AC motor 14 at a constant value (that is, a torque command value T2*).

Then, at the next step 104, the torque control current vector it2* representing the d-axis torque control current idt2* and the q-axis torque control current iqt2* is synthesized with the power control current vector ip* representing the d-axis power control current idp* and the q-axis power control current iqp* in order to compute a final command current vector i2* representing the d-axis command current id2* and the q-axis command current iq2* in accordance with the following equation:

$$i2^*(id2^*, iq2^*) = it2^*(idt2^*, iqt2^*) + ip^*(idp^*, iqp^*)$$

After the final command current vector i2* is computed as described above, as shown in FIG. 2, a second current vector control unit 55 computes an actual current vector i2 representing a d-axis current id2 and a q-axis current iq2 on the basis of signals output by the current sensors 43 and 44 as signals representing respectively the U-phase current iU2 and W-phase current iW2 of the second AC motor 14 as well as a signal output by the rotor rotational position sensor 40 as a signal representing the rotor rotational position θ2 of the second AC motor 14. Then, the second current vector control unit 55 computes a d-axis command voltage Vd2* by execution of P-I control for reducing a difference Δid2 between the d-axis command current idt2* and the actual d-axis current id2, and computes a q-axis command voltage Vq2* by execution of P-I control for reducing a difference Δiq2 between the q-axis command current iqt2* and the actual q-axis current iq2. Finally, the second current vector control unit 55 converts the d-axis command voltage Vd2* and the q-axis command voltage Vq2* into the three-phase PWM command signals UU2, UV2 and UW2, outputting the three-phase PWM command signals UU2, UV2 and UW2 to the three-phase second inverter 28.

As described above, the control of stabilizing the system voltage is executed by adjusting the input power of the second MG unit 30 (or the second AC motor 14) in order to decrease the difference ΔVs between the target value Vs* of the system voltage and the detected value Vsf output by the low pass filtering process as the detected value of the system voltage while sustaining the torque generated by the second AC motor 14 at a constant value (that is, a torque command value T2*).

In addition, in order to obviate mutual interferences between the system voltage stabilization control to stabilize the system voltage by adjusting the input power of the second MG unit 30 as described above and the control executed by the voltage boosting converter 21 to adjust the system voltage, the motor control unit 37 executes conversion power control of controlling a conduction duty ratio Dc of a switching device (not shown) as a device employed in the voltage boosting converter 21 so as to reduce the difference ΔPi between a command value Pi* of a power, which is output by the voltage boosting converter 21 as a power referred to hereafter as a conversion power, and a detected value Pi of the conversion power.

Specifically, in order to compute a command value Pi* of the conversion power, first of all, a torque command value T1* and rotation speed N1 of the first AC motor 13 are supplied to a first output computation unit 56 to be used for computing a output PD1 of the first AC motor 13. At the same time, the torque command value T1* and rotation speed N1 of the first AC motor 13 are supplied to a first output loss computation unit 57 to be used for computing an output loss PL1 of the first MG unit 29. Then, an adder 58 adds the output PD1 of the first AC motor 13 to the output loss PL1 of the first MG unit 29 in order to compute an input power Pi1 of the first MG unit 29. At that time, if the first AC motor 13 is functioning as a generator, the computation result of the input power Pi1 of the MG unit 29 is a negative value.

In the mean time, a torque command value T2* and rotation speed N2 of the second AC motor 14 are supplied to a second output computation unit 59 to be used for computing a output PD2 of the second AC motor 14. At the same time, the torque command value T2* and rotation speed N2 of the second AC motor 14 are supplied to a second output loss computation unit 60 to be used for computing a output loss PL2 of the second MG unit 30. Then, an adder 61 adds the output PD2 of the second AC motor 14 to the output loss PL2 of the second MG unit 30 in order to compute an input power Pi2 of the second MG unit 30. At that time, if the second AC motor 14 is functioning as a motor, the computation result of the input power Pi2 of the second MG unit 30 is a positive value.

Then, an adder 62 adds the input power Pi1 of the first MG unit 29 to the input power Pi2 of the second MG unit 30 to compute a total power Pi*. Then, an adder 70 adds the total power Pi* to a conversion power correction quantity Px to be described below to result in a corrected total power Pix*. This corrected total power Pix* is supplied to a second low pass filter 63 serving as a second low-frequency component passing means for carrying out a low pass filtering process to pass only components included in the corrected total power Pix* as components each having a low frequency. A total power Pif* obtained by the low pass filtering process is taken as a command value Pif* of the conversion power. The adder 62, the adder 70 and the second low pass filter 63 operate as a conversion power command value computation means.

In order to compute a detected value Pi of the conversion power, on the other hand, a signal output by the current sensor 26 as a signal representing a detected value ic of the output current of the voltage boosting converter 21 is supplied to a third low pass filter 64 serving as a third low-frequency component passing means for carrying out a low pass filtering process to pass only components included in the output current of the voltage boosting converter 21 as components each having a low frequency. The third low pass filter 64 supplies a detected value icf of the output current of the voltage boosting converter 21 as a result obtained from the low pass filtering process to a conversion power detection unit 65 serving as a conversion value computation means. The conversion power detection unit 65 multiplies the detected value icf by a target value Vs* of the system voltage in order to compute a detected value Pi of the conversion power. It is to be noted that a detected value Pi of the conversion power can also be computed by multiplying the detected value icf of the output current of the voltage boosting converter 21 by the detected value Vsf of the system voltage.

Then, a subtractor 66 computes a difference ΔPi between a command value Pif* and detected value Pi of the conversion power. The subtractor 66 supplies the difference ΔPi to a P-I controller 67 serving as a conversion power control-quantity computation means for computing a conduction duty ratio Dc of a switching device (not shown) by execution of P-I control to reduce the difference ΔPi between a command value Pif* and detected value Pi of the conversion power. The conduction duty ratio Dc is supplied to a voltage boosting drive signal computation unit 68 serving as a conversion power control means. Subsequently, the voltage boosting drive signal computation unit 68 computes voltage boosting drive signals UCU and UCL on the basis of the conduction duty ratio Dc and supplies the voltage boosting drive signals UCU and UCL to the voltage boosting converter 21.

As described above, the conversion power control of adjusting the conversion power of the voltage boosting converter 21 is executed in order to reduce the difference ΔPi between the command value Pif* and detected value Pi of the conversion power and, at the same time, obviate mutual interferences between the system voltage stabilization control to stabilize the system voltage by adjusting the input power of the second MG unit 30 and the control executed by the voltage boosting converter 21 to adjust the system voltage.

Here, if the precision of the conversion power control decreases due to some reasons such as manufacturing dispersions of machine constants of the AC motors and AC-motor aging with the lapse of time, causing variations in system voltage (that is, offsets between the system voltage and a target value) to increase, the system voltage variations caused by errors of the conversion power control can be corrected by execution of the system voltage stabilization control to stabilize the system voltage by adjusting the input power of the second MG unit 30 as described above. In this case, however, the operation to correct the variations in system voltage increases a load borne by the system voltage stabilization control to stabilize the system voltage. Thus, the dynamic range of the system voltage stabilization control to stabilize the system voltage unavoidably becomes narrower. As a result, it is likely that the function to stabilize the system voltage cannot be implemented sufficiently.

To solve the above problem, the motor control unit 37 computes a conversion power correction quantity Px on the basis of information on the system voltage stabilization control to stabilize the system voltage and reflects the conversion power correction quantity Px in the conversion power control in order to correct the conversion power, which is the power output by the voltage boosting converter 21. An example of the information on the system voltage stabilization control to stabilize the system voltage is the input power operation quantity Pm. That is, if the precision of the conversion power control decreases, causing control errors to increase, variations in conversion power and, hence, variations in the system voltage also rise as well accordingly. In this case, the input power operation quantity Pm of the system voltage stabilization control to correct the variations in system voltage varies. Thus, on the basis of the input power operation quantity Pm of the system voltage stabilization control to correct the variations in system voltage, the motor control unit 37 is capable of computing a conversion power correction quantity Px, which reflects a control error of the conversion power control with a high degree of precision. As a result, by reflecting the conversion power correction quantity Px in the conversion power control, the control error of the conversion power control can be reduced so as to decrease variations in conversion power and, hence, variations in system voltage.

Figure 5:
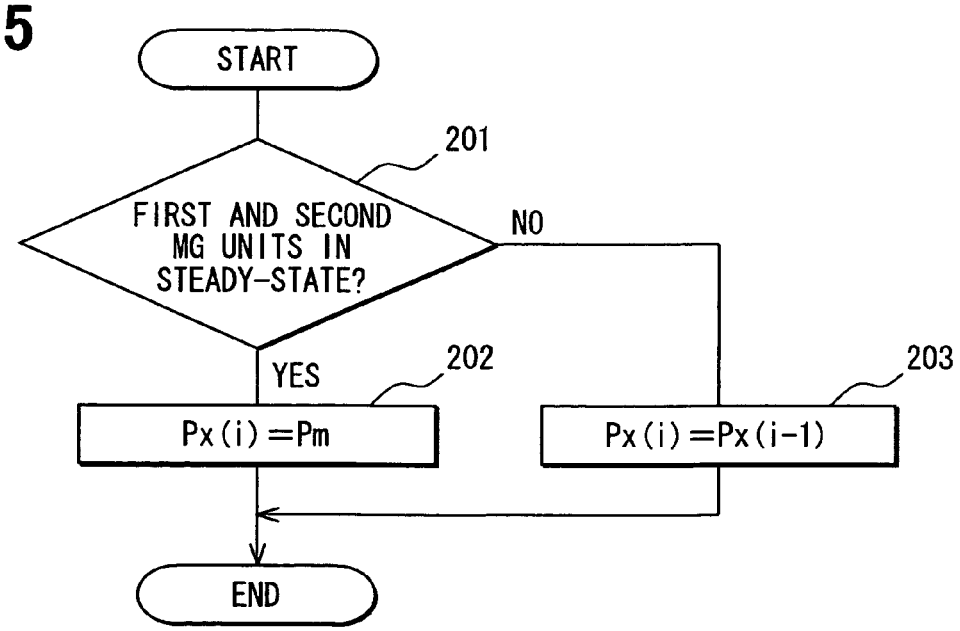
FIG. 5 is a flowchart representing processing of a subprogram to be executed to compute a quantity used for correcting a conversion power in the first embodiment.
Figure 6:
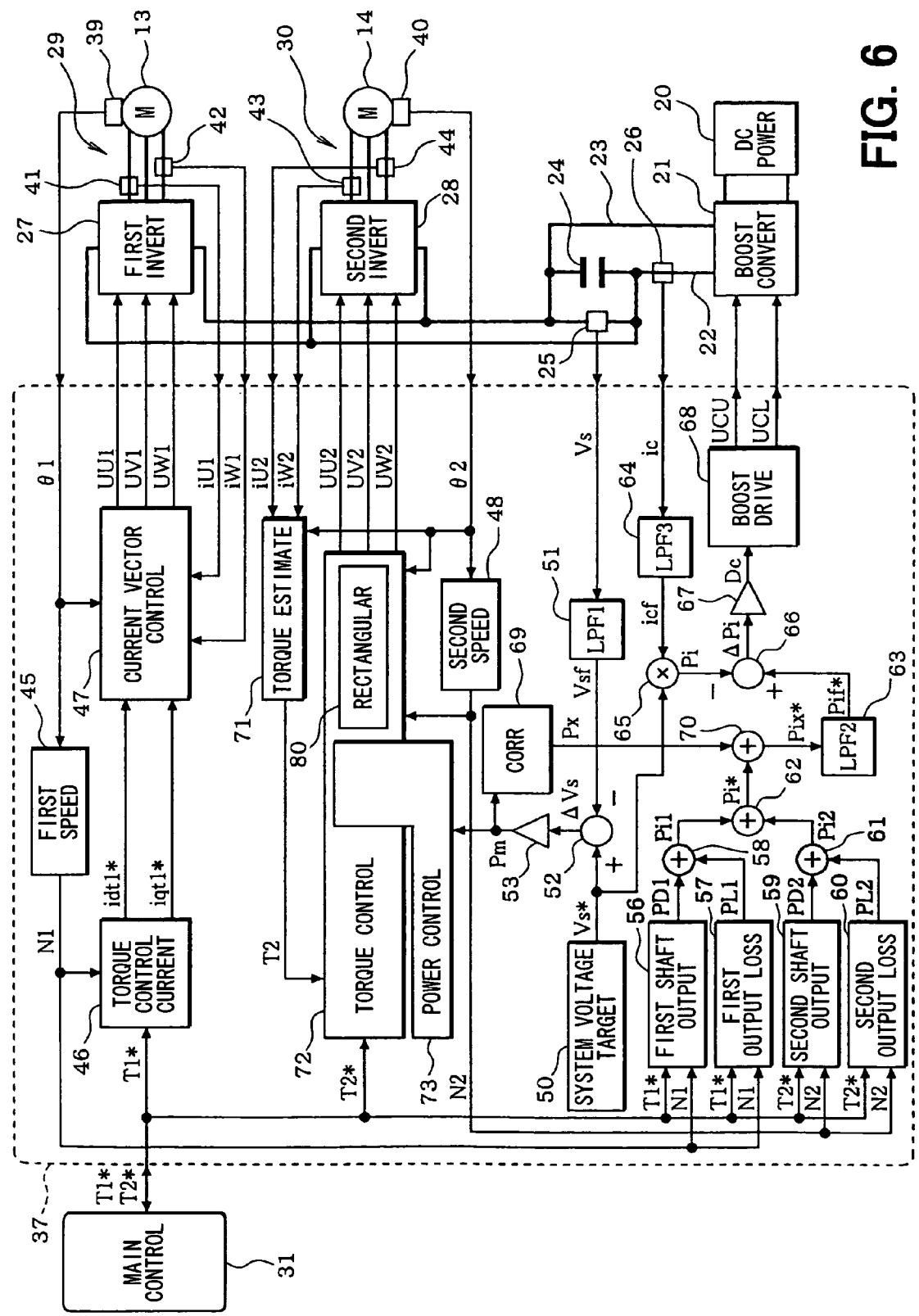
FIG. 6 is a block diagram showing a control system for controlling AC motors in accordance with a second embodiment of the present invention.

Specifically, first of all, the input power operation quantity Pm output by the P-I controller 53 is supplied to a correction quantity computation unit 69 serving as a correction quantity computation means for computing a conversion power correction quantity Px. The conversion power correction quantity Px is computed by execution of a conversion power correction quantity computation program shown in FIG. 5. The flowchart representing the conversion power correction quantity computation program begins at step 201 to produce a result of determination as to whether or not the first and second MG units 29 and 30 are each in a steady state by determining whether or not all conditions (1) to (3) listed below are satisfied.

(1): The command values of the torques (the estimated torques) of the first and second AC motors 13 and 14 are substantially unchanged.

(2): The vehicle speed is substantially unchanged.

(3): The brake is not being operated.

If all the above conditions (1) to (3) are satisfied, the result of the determination indicates that the first and second MG units 29 and 30 are each in the steady state. If even only one of the above conditions (1) to (3) is not satisfied, on the other hand, the result of the determination indicates that at least one of the first and second MG units 29 and 30 is not in the steady state.

If the determination result produced at the step 201 indicates that the first and second MG units 29 and 30 are each in the steady state, the processing proceeds to step 202, at which the input power operation quantity Pm is taken as the current conversion power correction quantity Px (i) as expressed by the following equation:

$$Px(i)=Pm$$

This is because, when the first and second MG units 29 and 30 are each in the steady state, the balance of power between the first and second AC motors 13 and 14 hardly changes. Thus, conversion power variations (or variations in system voltage) caused by a change in balance of power between the first and second AC motors 13 and 14 hardly occurs. That is, only conversion power variations (or variations in system voltage) caused by a control error of the conversion power control are observed. Therefore, when the first and second MG units 29 and 30 are each in the steady state, the input power operation quantity Pm is taken as the current conversion power correction quantity Px (i). In this way, it is possible to set a conversion power correction quantity Px that precisely reflects the conversion power variations (or the variations in system voltage) caused by a control error of the conversion power control almost without being affected by the conversion power variations (or the variations in system voltage) caused by a change in balance of power between the first and second AC motors 13 and 14.

If the determination result produced at the step 201 indicates that at least one of the first and second MG units 29 and 30 is not in the steady state, on the other hand, the processing proceeds to step 203 at which the immediately preceding conversion power correction quantity Px (i−1) is taken as the current conversion power correction quantity Px (i) as expressed by the following equation:

$$Px(i)=Px(i-1)$$

It is to be noted that, if the first and second MG units 29 and 30 are each in the steady state, a new value of the conversion power correction quantity Px is learned each time the conversion power correction quantity Px is updated. In the case of a system reflecting a learned value in the conversion power control executed thereafter, the conversion power correction quantity Px is set at 0 at the step 203.

As shown in FIG. 2, the conversion power correction quantity Px computed by the correction quantity computation unit 69 is supplied to the adder 70 serving as a conversion power correction means for adding the conversion power correction quantity Px to a total power Pi* in order to produce a corrected total power Pix*. Then, the correction quantity computation unit 69 computes a command value Pif* of the conversion power on the basis of the corrected total power Pix* in order to correct the conversion power, which is defined as the output power of the voltage boosting converter 21, by reflecting the conversion power correction quantity Px in the conversion power control.

In the above first embodiment, the vector of a current flowing to the second AC motor 14 is adjusted in order to reduce the difference ΔVs between the target value Vs* and detected value Vsf of the system voltage, that is, the input power of the second MG unit 30 (or the second AC motor 14) is adjusted in execution of the system voltage stabilization control to suppress variations of the system voltage appearing on the power supply line 22. Thus, even if the balance of power between the first and second AC motors 13 and 14 changes substantially due to a change of the operating condition of the electric vehicle or for another reason, the system voltage can be stabilized effectively. In addition, it is possible to enhance the effect of stabilizing the system voltage appearing on the power supply line 22 while meeting demands for a system having a small size and a low cost without requiring the voltage boosting converter 21 to be of better performance and the smoothing capacitor 24 to have a larger capacitance.

It is likely that, if the system voltage stabilization control is executed in order to stabilize the system voltage by adjusting the input power of the second MG unit 30 (or the second AC motor 14), there are mutual interferences between the system voltage stabilization control to stabilize the system voltage by adjusting the input power of the second MG unit 30 (or the second AC motor 14) and the control executed by the voltage boosting converter 21 to adjust the system voltage. In the case of the first embodiment, however, the command value Pif* is computed from the total power Pif obtained by adding the input power Pi1 of the first AC motor 13 to the input power Pi2 of the second AC motor 14. At the same time, the detected value Pi is computed by multiplying the detected value icf of the output current of the voltage boosting converter 21 by the target value Vs* (or the detected value Vsf) of the system voltage. Then, the conversion power control of adjusting the output power of the voltage boosting converter 21 is executed in order to reduce the difference ΔPi between the command value Pif* and detected value Pi of the conversion power. Thus, it is possible to obviate the mutual interferences between the system voltage stabilization control to stabilize the system voltage by adjusting the input power of the second MG unit 30 and the control executed by the voltage boosting converter 21 to adjust the system voltage.

If the system voltage variations caused by errors of the conversion power control can be corrected by execution of the system voltage stabilization control to stabilize the system voltage by adjusting the input power of the second MG unit 30 as described above, however, the operation to correct the variations in system voltage increases a load borne by the system voltage stabilization control to stabilize the system voltage. Thus, the dynamic range of the system voltage stabilization control to stabilize the system voltage unavoidably becomes narrower. As a result, it is likely that the function to stabilize the system voltage cannot be implemented sufficiently.

To solve the above problem, in the case of the first embodiment, when the first and second MG units 29 and 30 are in the steady state, the motor control unit 37 computes the conversion power correction quantity Px from the input power operation quantity Pm of the system voltage stabilization control. In this way, it is possible to set the conversion power correction quantity Px that precisely reflects conversion power variations (or variations in system voltage) caused by a control error of the conversion power control almost without being affected by the conversion power variations (or the variations in system voltage) caused by a change in balance of power between the first and second AC motors 13 and 14. Then, the conversion power correction quantity Px is reflected in the conversion power control of correcting of the conversion power in order to reduce a control error of the conversion power control. This makes it possible to prevent the dynamic range of the system voltage stabilization control to stabilize the system voltage from becoming narrower and possible to implement the function to stabilize the system voltage sufficiently.

In addition, in accordance with the first embodiment, in execution of the system voltage stabilization control in the system for controlling the second AC motor 14 by the sinusoidal-waveform PWM control method, the current vector is adjusted in order to change only the reactive power contributing none to generation of the torque of the second AC motor 14. In this way, the system voltage is controlled by adjusting the input power of the second AC motor 14 while sustaining the torque generated by the second AC motor 14 unchanged (that is, a torque command value T2*). Thus, variations in system voltage can be suppressed without badly affecting the operating state of the electric vehicle.

Further, in the case of the first embodiment, the current vector of the second AC motor 14 is adjusted in order to control the input power of the second AC motor 14 while sustaining the torque generated by the second AC motor 14 unchanged. It is to be noted, however, that the voltage vector of the second AC motor 14 can also be adjusted in order to control the input power of the second AC motor 14 while sustaining the torque generated by the second AC motor 14 unchanged.

Second Embodiment

In the second embodiment, components essentially identical with their respective counterparts employed in the first embodiment are denoted by the same reference numerals as the counterparts and described only briefly. That is, the following description is made on differences from the first embodiment.

In the first embodiment, the second AC motor 14 is controlled by the sinusoidal-waveform PWM control method. In the case of the second embodiment, however, the second AC motor 14 is controlled by a rectangular waveform control method.

In execution of torque control on the second AC motor 14, the motor control unit 37 generates three-phase voltage command signals UU2, UV2 and UW2 by the rectangular waveform control method on the basis of the torque command value T2* output by the main control unit 31, the U-phase current iU2 and W-phase current iW2 of the second AC motor 14 as well as the rotor rotational position θ2 of the second AC motor 14. The rectangular waveform control method adopted for the second AC motor 14 is a method of changing electrical conduction of the AC motor 14 every predetermined value of an electrical angle of the AC motor 14.

Figure 9A:
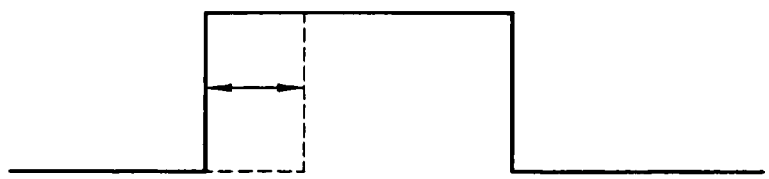
FIGS. 9A and 9B are diagrams showing a duty ratio operation and a phase operation attained in the second embodiment.
Figure 9B:
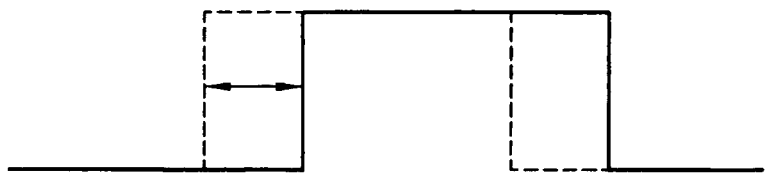

In controlling the AC motor 14 by the rectangular waveform control method, as shown in FIG. 9A, the duty ratio Duty of the rectangular waveform of a current flowing to the AC motor 14 is changed in order to vary the pulse width of the rectangular waveform. At the same time, the phase φ of the rectangular waveform is also changed as shown in FIG. 9B in order to sustain the torque generated by the second AC motor 14 at constant value (that is, at a torque command value T2*). Thus, by adjusting the duty ratio Duty and the phase φ, the input power of the second AC motor 14 can be controlled so as to suppress variations in system voltage, while sustaining the torque generated by the second AC motor 14 unchanged (that is, at the torque command value T2*).

Specifically, first of all, the signal output by the rotor rotational position sensor 40 as a signal representing the rotor rotational position θ2 of the second AC motor 14 is supplied to the rotation speed computation unit 48 for computing the rotation speed N2 of the second AC motor 14. At the same time, signals output by the current sensors 44 and 43 as signals representing respectively the U-phase current iU2 and W-phase current iW2 of the second AC motor 14 as well as the signal representing the rotor rotational position θ2 of the second AC motor 14 are supplied to a torque estimation unit 71 for estimating a torque T2 generated by a current flowing to the second AC motor 14.

Figure 7:
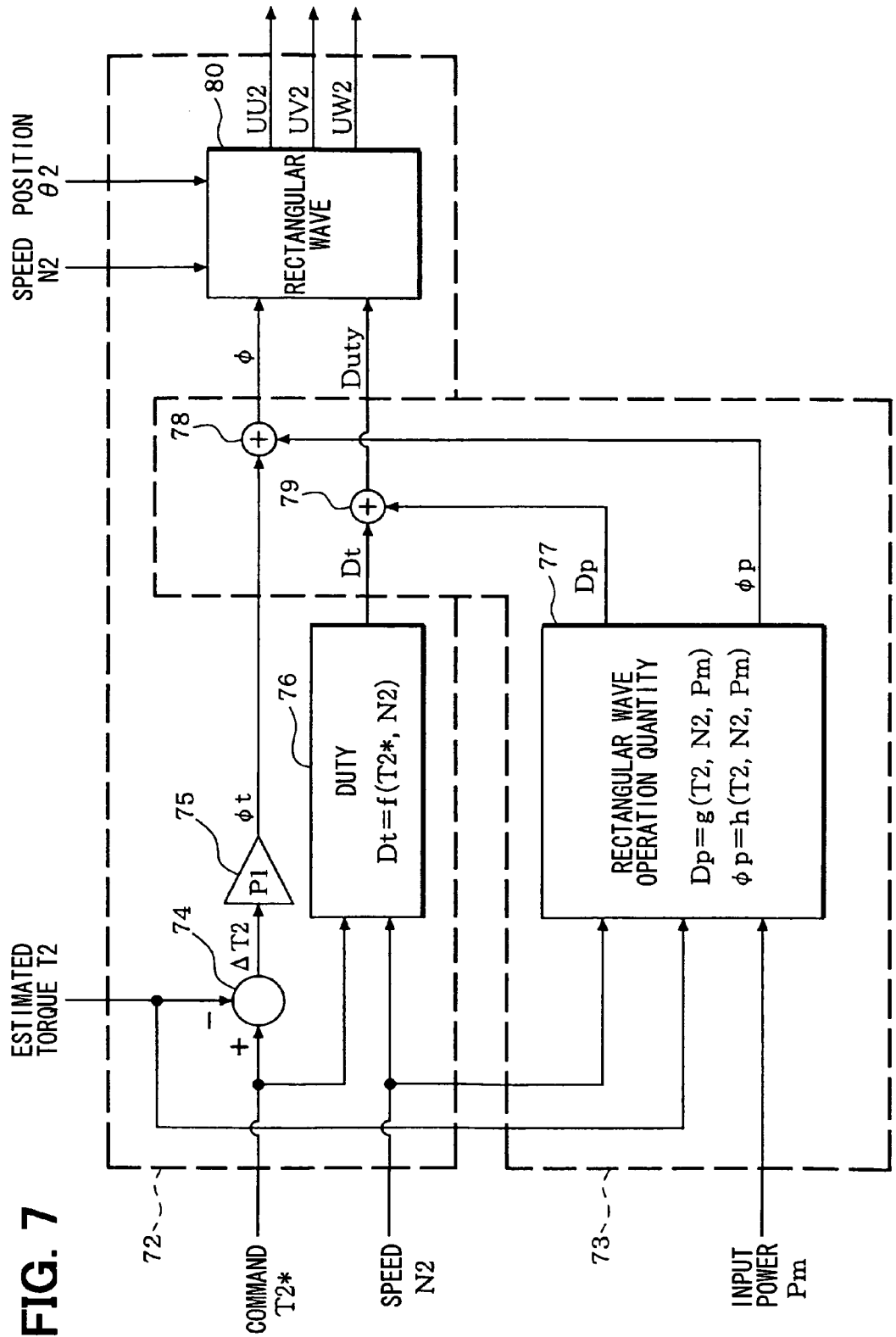
FIG. 7 is a block diagram showing a torque control unit and a power control unit in the second embodiment.

Then, as shown in FIG. 7, a subtractor 74 employed in the torque control unit 72 serving as a motor control means computes a difference ΔT2 between the torque command value T2* of the second AC motor 14 and the estimated torque value T2, supplying the difference ΔT2 to a P-I controller 75. The P-I controller 75 executes P-I control to adjust a phase φt of the rectangular waveform so that the phase φt reduces the difference ΔT2 between the torque command value T2* and the estimated value T2. A duty computation unit 76 computes a duty ratio Dt of the rectangular waveform on the basis of the torque command value T2* of the second AC motor 14 and the rotation speed N2 of the second AC motor 14 by using typically map data or an equation.

Then, the input power operation quantity Pm output by the P-I controller 52, the estimated torque T2 for the second AC motor 14 and the rotation speed N2 of the second AC motor 14 are supplied to a rectangular waveform operation quantity computation unit 77 (serving as a rectangular waveform operation quantity computation means) employed in a power control unit 73 (serving as a system voltage control means) in order to compute a duty ratio operation quantity Dp and phase operation quantity φp of the rectangular waveform as follows.

Figure 8:
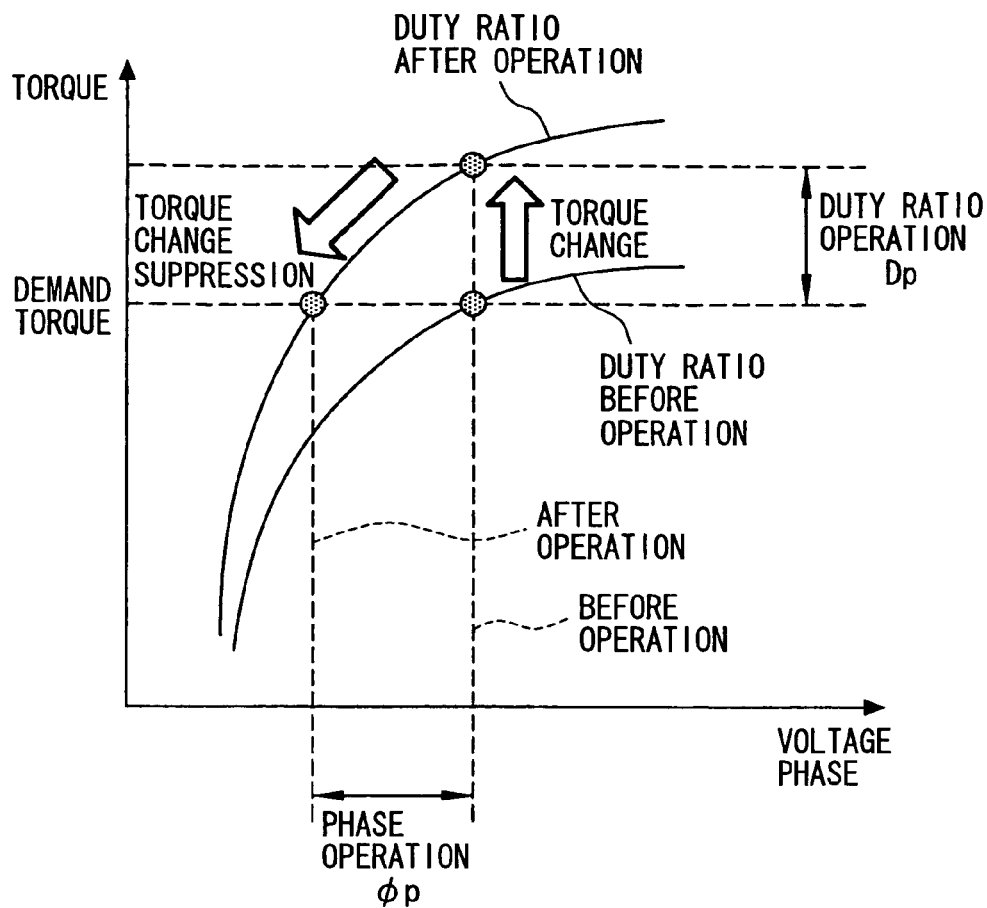
FIG. 8 is a graph showing a relation between a voltage phase and a torque used for computing a duty ratio operation quantity and a phase operation quantity.

First of all, the duty ratio operation quantity Dp of the rectangular waveform is computed on the basis of the input power operation quantity Pm, the estimated torque T2 and the rotation speed N2 by using typically map data or an equation. To be more specific, the rectangular waveform operation quantity computation unit 77 computes a duty ratio operation quantity Dp that changes the input power of the second AC motor 14 by the input power operation quantity Pm as shown in FIG. 8. Then, the phase operation quantity φp of the rectangular waveform is computed on the basis of the input power operation quantity Pm, the estimated torque T2 and the rotation speed N2 by using typically map data or an equation. To be more specific, the rectangular waveform operation quantity computation unit 77 computes the phase operation quantity φp for the duty ratio operation quantity Dp as a phase operation quantity that suppresses variations of a torque generated by the second AC motor 14 by a duty ratio operation based on the duty ratio operation quantity Dp as shown in FIG. 8.

The rectangular waveform operation quantity computation unit 77 includes a quantity limiting means (not shown). The quantity limiting means is for carrying out a guarding process to prevent each of the phase operation quantity φp and the duty ratio operation quantity Dp from exceeding a predetermined limit value. To be more specific, the limiting means prevents each of the phase operation quantity φp and the duty ratio operation quantity Dp from increasing to an excessively large value greater than the predetermined limit value.

It is to be noted that, in the processing to compute the phase operation quantity φp and the duty ratio operation quantity Dp, the torque command value T2* can be used as a substitute for the estimated torque T2. In addition, as will be described later, the rectangular waveform operation quantity computation unit 77 may also compute a phase operation quantity φp on the basis of a final duty ratio Duty (=Dt+Dp) described later and the torque command value T2* as a phase operation quantity φp suppressing torque variations generated by the second AC motor 14 by the duty ratio operation based on the duty ratio.

Then, an adder 78 in the power control unit 73 adds the phase operation quantity φp to the phase φt of the rectangular waveform to produce a final phase φ (=φt+φp) of the rectangular waveform. At the same time, an adder 79 in the power control unit 73 adds the duty ratio operation quantity Dp to the duty ratio Dt of the rectangular waveform to produce a final duty ratio Duty (=Dt+Dp) of the rectangular waveform. Then, a rectangular waveform computation unit 80 in the torque control unit 72 computes three-phase voltage command signals UU2, UV2 and UW2 (rectangular waveform command signals) on the basis of the final phase φ of the rectangular waveform, the final duty ratio Duty of the rectangular waveform, the rotor rotational position θ2 of the second AC motor 14 and the rotation speed N2 of the second AC motor 14, outputting the three-phase voltage command signals UU2, UV2 and UW2 to the three-phase second inverter 28.

In this way, the system voltage stabilization control is executed by adjusting the input power of the second MG unit 30 (or the second AC motor 14) to suppress variations in system voltage by reducing the difference ΔVs between the target value Vs* and detected value Vsf of the system voltage while sustaining the torque generated by the second AC motor 14 unchanged (that is, at the torque command value T2*).

In addition, much like the first embodiment, in order to obviate mutual interferences between the system voltage stabilization control to stabilize the system voltage by adjusting the input power of the second MG unit 30 as described above and the control executed by the voltage boosting converter 21 to adjust the system voltage, the motor control unit 37 executes conversion power control of controlling a conduction duty ratio Dc of a switching device (not shown) as a device employed in the voltage boosting converter 21 so as to reduce the difference ΔPi between the command value Pi* of a power, which is output by the voltage boosting converter 21 as a power referred to hereafter as a conversion power, and a detected value Pi of the conversion power.

Much like the first embodiment, in order to correct conversion power variations (that is, variations in system voltage) caused by a control error of the conversion power control, the motor control unit 37 computes a conversion power correction quantity Px on the basis of information on the system voltage stabilization control to stabilize the system voltage and reflects the conversion power correction quantity Px in the conversion power control in order to correct the conversion power, which is the power output by the voltage boosting converter 21. An example of the information on the system voltage stabilization control to stabilize the system voltage is the input power operation quantity Pm.

In the case of the second embodiment, the duty ratio Duty and phase φ of the rectangular waveform of a current flowing to the second AC motor 14 are adjusted in order to reduce the difference ΔVs between the target value Vs* and detected value Vsf of the system voltage. That is, the input power of second MG unit 30 (or the second AC motor 14) is controlled in the system voltage stabilization control so as to suppress variations of the system voltage appearing in the power supply line 22. Thus, the same effects as the first embodiment can be obtained.

In addition, in accordance with the second embodiment, in execution of the system voltage stabilization control in a system controlling the second AC motor 14 by the rectangular waveform control method, the rectangular waveform operation quantity computation unit 77 computes the duty ratio operation quantity Dp that changes the input power of the second AC motor 14 by the input power operation quantity Pm and, then, the rectangular waveform operation quantity computation unit 77 computes the phase operation quantity φp for the duty ratio operation quantity Dp as the phase operation quantity that suppresses variations of a torque generated by the second AC motor 14 by a duty ratio operation based on the duty ratio operation quantity Dp. Thus, the system voltage can be controlled by adjusting the input power of the second AC motor 14 while sustaining the torque generated by the second AC motor 14 unchanged (that is, at the torque command value T2*). As a result, variations in system voltage can be suppressed without adversely affecting the operating state of the electric vehicle.

Much like the first embodiment, also in the second embodiment, the motor control unit 37 computes the conversion power correction quantity Px on the basis of information on the system voltage stabilization control to stabilize the system voltage and reflects the conversion power correction quantity Px in the conversion power control in order to correct the conversion power, which is the power output by the voltage boosting converter 21, in order to correct the conversion power. An example of the information on the system voltage stabilization control to stabilize the system voltage is the input power operation quantity Pm. Thus, a load borne by the system voltage stabilization control to stabilize the system voltage can be reduced. As a result, the dynamic range of the system voltage stabilization control to stabilize the system voltage can be prevented from becoming narrower so that the function to stabilize the system voltage can be implemented sufficiently.

As described above, in the first and second embodiments, the conversion power correction quantity Px is computed on the basis of the input power operation quantity Pm of the system voltage stabilization control. It is to be noted, however, that the conversion power correction quantity can also be computed on the basis of other control information on the system voltage stabilization control. Examples of the other control information are the difference ΔVs between the target value Vs* and detected value Vsf of the system voltage, the power control vector ip*, the command current vector i2*, the duty ratio operation quantity Dp and the phase operation quantity φp.

In addition, in the first and second embodiments, the adder 70 adds the total power Pi* to the conversion power correction quantity Px to result in the corrected total power Pix*, which is supplied to the second low pass filter 63 for generating the command value Pif* of the conversion power. In this way, the conversion power correction quantity Px is reflected in the conversion power control. However, the method to reflect the conversion power correction quantity Px in the conversion power control can be properly changed to another technique. For example, the detected value Pi of the conversion power can be corrected by using the conversion power correction quantity Px, or the difference ΔPi between the command value Pif* and detected value Pi of the conversion power can be corrected by using the conversion power correction quantity Px.

On the top of that, in the first and second embodiments, the conversion power control of adjusting the output power of the voltage boosting converter 21 is executed in order to reduce the difference ΔPi between the command value Pi* and detected value Pi of the conversion power. Instead of adjusting the output power of the voltage boosting converter 21, however, the conversion power control of adjusting the input power of the voltage boosting converter 21 can also be executed in order to reduce the difference ΔPi between the command value Pi* and detected value Pi of the conversion power.

Furthermore, in the first and second embodiments, in execution of the system voltage stabilization control, the input power of the second MG unit 30 (or the second AC motor 14) is controlled to suppress variations in system voltage. Instead of controlling the input power of the second MG unit 30 (or the second AC motor 14), however, the input power of the second MG unit 29 (or the first AC motor 13) can also be controlled to suppress variations in system voltage. As an alternative, although not shown, in a all-wheel driving configuration including a third MG unit mounted on the dependent wheels, for example, the input power of the third MG unit can also be controlled so as to suppress variations in system voltage.

Moreover, the first and second embodiments are directed to a hybrid vehicle of the split type, which splits the power of the engine by using the planetary gear set. However, the embodiments may be modified to a hybrid vehicle adopting another method such as a parallel type and a series type. Furthermore, the first and second embodiments use AC motors and an engine as power sources. However, the embodiments may be modified a vehicle employing only AC motors as a power source. In addition, the embodiments may employ only one MG unit comprising an inverter and an AC motor as well as a vehicle employing three or more MG units.

What is claimed is:
1. A control apparatus for an electric vehicle, comprising:
a power converter that converts a voltage supplied by a DC power supply into a system voltage appearing on a power supply line;
an MG unit that includes an inverter connected to the power supply line and drives an AC motor;
a system voltage stabilization controller that executes system voltage stabilization control to stabilize the system voltage by adjusting an input power of the MG unit in order to suppress variations in the system voltage while sustaining a torque generated by the AC motor at a torque command value; and
a conversion power controller that executes conversion power control on the basis of control information, which is defined as information on the system voltage stabilization control to stabilize the system voltage, to adjust a conversion power, which is defined as an input or output power of the power converter.
2. The control apparatus according to claim 1, further comprising:

a correction quantity calculator that computes a correction quantity of the conversion power on the basis of the control information defined as the information on the system voltage stabilization control; and
a conversion power corrector that corrects the conversion power by reflecting the correction quantity in the conversion power computed by the correction quantity calculator.

3. The control apparatus according to claim 2, wherein the correction quantity calculator computes the correction quantity of the conversion power on the basis of control information on the system voltage stabilization control to stabilize the system voltage, when the MG unit is in a steady state.

4. The control apparatus according to claim 2, further comprising:
a target voltage setter that sets a target value of the system voltage;
a voltage detector that detects the system voltage; and
a power operation quantity calculator that computes an operation quantity of an input power of the MG unit on the basis of a value set by the target voltage setter for setting the target value of the system voltage and a system voltage detected by the voltage detector,
wherein the system voltage stabilization controller controls the system voltage by adjusting the input power of the MG unit on the basis of a quantity computed by the power operation quantity calculator as the operation quantity of the input power.

5. The control apparatus according to claim 2, further comprising:
a conversion power command value calculator that computes a command value of the conversion power;
a conversion power detector that detects the conversion power; and
a conversion power control quantity calculator that computes a control quantity of the conversion power on the basis of a value computed by the conversion power command value calculator as the command value of the conversion power and a conversion power detected by the conversion power detector,
wherein the conversion power controller controls the conversion power on the basis of a control quantity computed by the conversion power control quantity calculator.

6. The control apparatus according to claim 2, wherein the system voltage stabilization controller controls the system voltage by adjusting an input power different from a power required for generation of a torque in the AC motor.

7. The control apparatus according to claim 6, further comprising:
a motor controller that controls the AC motor by a sinusoidal-waveform PWM control method,
wherein the system voltage stabilization controller controls the input power of the MG unit by adjusting a vector of a current flowing to the AC motor or a vector of a voltage applied to the AC motor by the sinusoidal-waveform PWM control method.

8. The control apparatus according to claim 6, further comprising:
a motor controller that controls the AC motor by a rectangular waveform control method,
wherein the system voltage stabilization controller controls the input power of the MG unit by adjusting a duty ratio and/or phase of a rectangular waveform representing an electrical conduction state of the AC motor by the rectangular waveform method.

9. The control apparatus according to claim 1, further comprising:
a target voltage setter that sets a target system voltage;
a voltage detector that detects the system voltage; and
a subtraction unit that produces a difference between the target system voltage and the system voltage detected by the voltage detector,
wherein the control information is determined in accordance with the difference produced by the subtraction unit.

10. A control apparatus for an electric vehicle, comprising:
a power converter that converts a voltage supplied by a DC power supply into a system voltage appearing on a power supply line;
an MG unit that includes an inverter connected to the power supply line and drives an AC motor;
a system voltage stabilization controller that executes system voltage stabilization control to stabilize the system voltage by adjusting an input power of the MG unit in order to suppress variations in the system voltage while sustaining a torque generated by the AC motor at a torque command value;
a conversion power controller that executes conversion power control on the basis of control information, which is defined as information on the system voltage stabilization control to stabilize the system voltage, to adjust a conversion power, which is defined as an input or output power of the power converter;
a correction quantity calculator that computes a correction quantity of the conversion power on the basis of the control information defined as the information on the system voltage stabilization control; and
a conversion power corrector that corrects the conversion power by reflecting the correction quantity in the conversion power computed by the correction quantity calculator,
wherein the correction quantity calculator computes the correction quantity of the conversion power on the basis of control information on the system voltage stabilization control to stabilize the system voltage, when the MG unit is in a steady state.

11. A control apparatus for an electric vehicle, comprising:
a power converter that converts a voltage supplied by a DC power supply into a system voltage appearing on a power supply line;
an MG unit that includes an inverter connected to the power supply line and drives an AC motor;
a system voltage stabilization controller that executes system voltage stabilization control to stabilize the system voltage by adjusting an input power of the MG unit in order to suppress variations in the system voltage while sustaining a torque generated by the AC motor at a torque command value;
a conversion power controller that executes conversion power control on the basis of control information, which is defined as information on the system voltage stabilization control to stabilize the system voltage, to adjust a conversion power, which is defined as an input or output power of the power converter;
a correction quantity calculator that computes a correction quantity of the conversion power on the basis of the control information defined as the information on the system voltage stabilization control; and
a conversion power corrector that corrects the conversion power by reflecting the correction quantity in the conversion power computed by the correction quantity calculator; wherein:

the system voltage stabilization controller controls the system voltage by adjusting an input power different from a power required for generation of a torque in the AC motor, the control apparatus further comprises a motor controller that controls the AC motor by a sinusoidal-waveform PWM control method, and the system voltage stabilization controller controls the input power of the MG unit by adjusting a vector of a current flowing to the AC motor or a vector of a voltage applied to the AC motor by the sinusoidal-waveform PWM control method.

12. A control apparatus for an electric vehicle, comprising:

a power converter that converts a voltage supplied by a DC power supply into a system voltage appearing on a power supply line;

an MG unit that includes an inverter connected to the power supply line and drives an AC motor;

a system voltage stabilization controller that executes system voltage stabilization control to stabilize the system voltage by adjusting an input power of the MG unit in order to suppress variations in the system voltage while sustaining a torque generated by the AC motor at a torque command value;

a conversion power controller that executes conversion power control on the basis of control information, which is defined as information on the system voltage stabilization control to stabilize the system voltage, to adjust a conversion power, which is defined as an input or output power of the power converter;

a correction quantity calculator that computes a correction quantity of the conversion power on the basis of the control information defined as the information on the system voltage stabilization control; and a conversion power corrector that corrects the conversion power by reflecting the correction quantity in the conversion power computed by the correction quantity calculator; wherein:

the system voltage stabilization controller controls the system voltage by adjusting an input power different from a power required for generation of a torque in the AC motor, the control apparatus further comprises a motor controller that controls the AC motor by a rectangular waveform control method, and the system voltage stabilization controller controls the input power of the MG unit by adjusting a duty ratio and/or phase of a rectangular waveform representing an electrical conduction state of the AC motor by the rectangular waveform method.

* * * * *